United States Patent [19]
Ahluwalia et al.

[11] Patent Number: 5,503,811
[45] Date of Patent: Apr. 2, 1996

[54] METHOD FOR REMOVING METAL VAPOR FROM GAS STREAMS

[76] Inventors: R. K. Ahluwalia, 6440 Hillcrest Dr., Burr Ridge, Ill. 60521; K. H. Im, 925 Lehigh Cir., Naperville, Ill. 60565

[21] Appl. No.: 308,853

[22] Filed: Sep. 19, 1994

[51] Int. Cl.$^6$ ............................................ C01G 11/00
[52] U.S. Cl. .................. 423/2; 95/37; 95/127
[58] Field of Search ................. 95/37, 127; 423/2

[56] References Cited

U.S. PATENT DOCUMENTS

| | | | |
|---|---|---|---|
| 4,482,479 | 11/1984 | Kamiya et al. | 252/630 |
| 4,750,916 | 6/1988 | Svensson | 55/5 |
| 4,957,512 | 9/1990 | Denisov et al. | 55/8 |
| 5,019,137 | 5/1991 | Routtu | 55/73 |

*Primary Examiner*—Ngoclan Mai
*Attorney, Agent, or Firm*—Mark P. Dvorscak; Robert J. Fisher; William R. Moser

[57] ABSTRACT

A process for cleaning an inert gas contaminated with a metallic vapor, such as cadmium, involves withdrawing gas containing the metallic contaminant from a gas atmosphere of high purity argon; passing the gas containing the metallic contaminant to a mass transfer unit having a plurality of hot gas channels separated by a plurality of coolant gas channels; cooling the contaminated gas as it flows upward through the mass transfer unit to cause contaminated gas vapor to condense on the gas channel walls; regenerating the gas channels of the mass transfer unit; and, returning the cleaned gas to the gas atmosphere of high purity argon. The condensing of the contaminant-containing vapor occurs while suppressing contaminant particulate formation, and is promoted by providing a sufficient amount of surface area in the mass transfer unit to cause the vapor to condense and relieve supersaturation buildup such that contaminant particulates are not formed. Condensation of the contaminant is prevented on supply and return lines in which the contaminant containing gas is withdrawn and returned from and to the electrorefiner and mass transfer unit by heating and insulating the supply and return lines.

11 Claims, 10 Drawing Sheets

5,503,811

METHOD FOR REMOVING METAL VAPOR FROM GAS STREAMS

CONTRACTUAL ORIGIN OF THE INVENTION

The United States Government has rights in this invention pursuant to contract No. W-31-109-ENG-38 between the U.S. Department of Energy and the University of Chicago.

BACKGROUND OF THE INVENTION

This invention relates to a process for gas cleanup to remove one or more metallic contaminants present as vapor. More particularly, the invention relates to a gas cleanup process using mass transfer to control the saturation levels such that essentially no particulates are formed, and the vapor condenses on the gas passage surfaces. It addresses the need to cleanup an inert gas contaminated with cadmium which may escape from the electrochemical processing of Integral Fast Reactor (IFR) fuel in a hot cell. The IFR is a complete, self-contained, sodium-cooled, pool-type fast reactor fueled with a metallic alloy of uranium, plutonium and zirconium, and is equipped with a close-coupled fuel cycle. Tests with a model have shown that removal of cadmium from argon gas is in the order of 99.99%. The invention could also apply to the industrial cleanup of air or other gases contaminated with zinc, lead, or mercury. In addition, the invention has application in the cleanup of other gas systems contaminated with metal vapors which may be toxic or unhealthy.

Pyrochemical processes are being developed to process Integral Fast Reactor (IFR) fuel material. The IFR fuel is a metallic uranium-plutonium-zirconium alloy clad in a stainless steel alloy. Electrorefining is the key step in the fuel processing cycle. In this operation, spent clad fuel is chopped and placed in baskets that are introduced into an electrorefiner (ER) vessel containing a molten LiCl-KCl salt mixture at 500° C. A pool of cadmium lies beneath the molten salt. The basket is connected to a dc power supply and made anodic; nearly pure uranium is removed from the spent fuel by electrotransport to solid cathodes, then the plutonium and any remaining uranium in the feedstock are electrotransported to liquid cadmium cathodes. More than 99.9% of the actinides are removed from the cladding hulls, and noble metal fission products either remain in the basket or fall as particulate to the bottom of the electrorefiner. The alkali and alkaline earth metals in the spent fuel are oxidized and remain in the electrorefiner salt, as do most of the rare-earth fission products. Engineering-scale investigations of this reprocessing scheme are being conducted in a large, positive-pressure glove box containing a high-purity argon atmosphere. These studies are being carried out using depleted uranium and nonradioactive fission product materials, not plutonium or radioactive fission products.

During these investigations, some cadmium has been released from the ER into the glove box. The resulting aerosol plateout caused blackening of the walls of the glove box. In a companion study, the aerosols suspended in the glove box were characterized from gas samples withdrawn from a port near the top of the glove box on the wall adjacent to the ER. The gas samples were withdrawn at a rate of 2.8 L/min, passed through a 47-mm-dia Nucleopore filter (0.2- μm pore size), and analyzed by X-ray diffraction (XRD) and by scanning electron microscopy combined with energy dispersive X-ray spectroscopy (SEM/EDX). The aerosols were found to consist mainly of cadmium, with some chlorine, but no potassium. No attempt was made to detect lithium in the aerosols. Aerosol concentration was highest immediately after opening the ER port. The primary particles were formed by homogeneous nucleation of vapor released from the ER and had a reference size of about 0.08 μm. Formation of particles larger than 0.20 μm was attributed to coagulation into agglomerates of the primary particles in the plume rising from the open ER port. Formation of particles exceeding 1 μm suggested coagulation of the agglomerates. There was clear evidence that upon continued exposure, the agglomerates were sintered in the hot plume and were transformed into hexagonal crystals typical of cadmium. The sizes of the crystals reflected the size distribution of the agglomerates from which they were formed.

In a related study, cadmium vaporization was investigated on a laboratory scale using a 5.08-cm-dia crucible containing a molten cadmium pool (2.54-cm-high) covered with a molten salt (9.0-cm-high). Experimental variables were the pool temperature, the cadmium-pool mixing speed, and the salt-pool mixing speed. The impellers that mixed the cadmium and salt pools were mounted on a single shaft. Each impeller consisted of four paddles approximately 3-cm-wide. The paddles were approximately 6-mm-high in the cadmium pool and 13-mm-high in the salt pool. At a mixing speed of 300 rpm, the cadmium vaporization rate increased from 8 $\mu g/h.cm^2$ at 451° C. pool temperature to 40 $\mu g/h.cm^2$ at 500° C. and to 290 $\mu g/h.cm^2$ at 608° C. An equally strong dependence of vaporization rate on mixing speed was observed. At 500° C., the cadmium vaporization rates in $\mu g/h.cm^2$ were 0.43 at 0 rpm, 7.7 at 50 rpm, 9.3 at 150 rpm, 19 at 200 rpm, 24 at 250 rpm, 40 at 300 rpm, and 67 at 500 rpm.

It is an object of the present invention to provide a process for gas cleanup to remove at least one metallic contaminant present as a vapor in a gas stream.

Another object of the present invention is to provide a gas cleanup process that controls saturation levels so that essentially no particulates are formed.

Yet another object of the present invention is to provide a gas cleanup process that avoids the requirement of a filter and concomitant problems with plugging, replacement, and disposal.

It is an object of the present invention to provide a system to reduce the cadmium concentration in an electrorefiner cover gas.

SUMMARY OF THE INVENTION

A process for cleaning an inert gas contaminated with a metallic vapor may comprise withdrawing gas containing the metallic contaminant from a gas atmosphere of high purity argon; passing the gas containing the metallic contaminant to a mass transfer unit having a plurality of hot gas channels separated by a plurality of coolant gas channels; cooling the contaminated gas as it flows upward through the mass transfer unit to cause contaminated gas vapor to condense on the gas channel walls; regenerating the gas channels of the mass transfer unit; and, returning the cleaned gas to the gas atmosphere of high purity argon. The condensing of the contaminant-containing vapor occurs while suppressing contaminant particulate formation, and is promoted by providing a sufficient amount of surface area in the mass transfer unit to cause the vapor to condense and relieve supersaturation buildup such that contaminant particulates are not formed. Condensation of the contaminant is prevented on supply and return lines in which the contaminant containing gas is withdrawn and returned from and to the electrorefiner and mass transfer unit by heating and insulating the supply and return lines.

In a process in which spent nuclear fuel is processed in an argon gas glove-box by placing the spent fuel in baskets that are introduced into an electrorefiner vessel containing a molten LiCl-KCl salt over a pool of cadmium, subjecting the fuel to an electrorefining process to remove 99.9% of the actinides from the fuel, but in which cadmium vapor is released from the electrorefiner into the glove-box, causing blackening of the glove-box walls, a method for removing the cadmium from the argon may comprise withdrawing the argon gas contaminated with cadmium vapor from the electrorefiner; directing the cadmium-containing gas to a mass transfer unit;

subjecting the cadmium-containing gas to a controlled cooling process to promote condensation of cadmium vapor in the mass transfer unit while suppressing particulate formation, such that the gas is now cleaned of cadmium; removing the cleaned gas from the mass transfer unit and cooling it; passing the cleaned and cooled gas back to the mass transfer unit and returning the cleaned gas to the electrorefiner.

The condensing of cadmium vapor is promoted by providing a sufficient amount of surface area in the mass transfer unit to cause the vapor to condense and relieve supersaturation buildup such that cadmium particulates are not formed. Condensation of cadmium is prevented on supply and return lines in which the cadmium containing gas is withdrawn and returned from and to the electrorefiner and mass transfer unit by heating and insulating the supply and return lines. A step can be provided for cleaning the mass transfer unit of cadmium which includes isolating the electrorefiner; heating clean gas supplied by a feed blower; passing the heated gas back to the mass transfer unit such that the flow of hot gas through the mass transfer unit raises the temperature of the condensed cadmium, causing the cadmium to melt and flow down through the mass transfer unit into a collector at the bottom of the mass transfer unit.

BRIEF DESCRIPTION OF THE DRAWINGS

The above-mentioned and other features of the invention will become more apparent and be best understood, together with the description, by reference to the accompanying drawings in which.

DETAILED DESCRIPTION OF THE INVENTION

Figure 1:
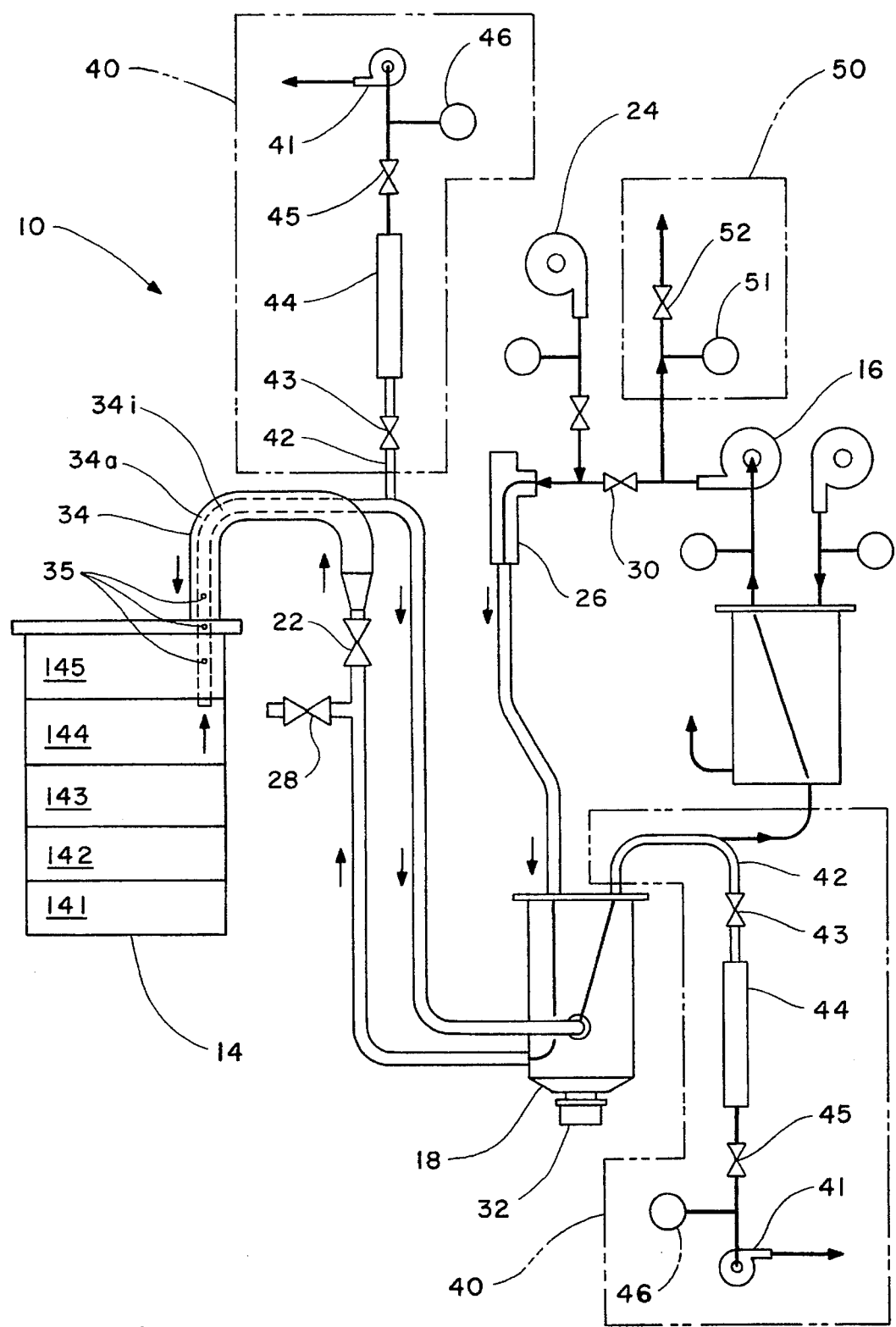
FIG. 1 shows a schematic view of a cadmium vapor system with electrorefiner in accordance with the present invention.

FIG. 1 shows a schematic of the cadmium vapor system, 10, which is located inside an argon glovebox (not shown), next to an electrorefiner (ER) 14. A circulation blower 16 withdraws cover gas contaminated with cadmium vapor from the ER cavity, passes it through a mass transfer unit (MTU) 18 that condenses the cadmium, and returns the cleaned gas to the ER. A cooler 20 downstream of the MTU cools the gas exiting the MTU to near room temperature. The cleaned gas is passed through the coolant side of the MTU and returned to the ER.

The electrorefiner 14 as shown in FIG. 1 is a cylindrical container having a liquid cadmium pool 141 at the bottom that lies beneath an electrolyte 142, preferably the salt LiCl-KCl eutectic. The gas atmosphere (hot zone 143) inside the container is high purity argon. A heat shield 144 separates the cover gas 143 in contact with the electrolyte 142 from a cool zone 145 between cover plate 146 and the top of the heat shield 144. The cover gas region (hot zone) 143 between the salt and the bottom of the heat shield has a mean temperature of about 475° C. In comparison, the cool zone 145 has an average temperature of about 205° C. The heat shield 144 contains a plurality of plates to reduce radiative heat transfer from the electrolyte 142 to the cover plate 146 of the container.

A special flow circuit provides for melting down cadmium condensed in the MTU 18 and cleaning the passages. During the cleaning operation, the circulation blower 16 is shut off, and the ER 14 is isolated by closing return valve 22. Feed blower 24 is turned on to supply 1 scfm (471.9 cm$^3$/s) of glovebox argon, which is heated in a cartridge circulation heater 26, passed through the return side 63 of the MTU, and discharged by opening bypass valve 28. Back flow through the circulation blower 16 is prevented by closing isolation valve 30. Flow of hot gas through the MTU raises the temperature of deposited cadmium, which melts and flows down into collector pot 32 at the bottom.

A coaxial tube 34 having an inner tube 34i and an annulus 34a is used to withdraw cover gas from the ER 14 and to return the cleaned gas. Gas is withdrawn through the inner tube 34i of tube 34 and returned through the annulus 34a. The inner pipe extends to within about 2 inches of the top of electrolyte, while the end of the annulus region is about 1 inch below the bottom of heat shield. This separation helps ensure that the returned gas mixes with the cover gas and is not directly drawn into the inner pipe. To further prevent formation of a recirculating flow loop, gas is discharged through three side holes 35 and the bottom of the annulus is blocked.

The supply and return lines between the ER 14 and MTU 18 are heated electrically and are insulated. This prevents cadmium condensation on the supply lines and maintains the cleaned gas at prevailing ER cover gas temperature. A heating system with 14 zones, some of which have multiple circuits, is used to regulate gas and surface temperatures.

To monitor cadmium concentration in the ER cover gas and the performance of the MTU, gas is sampled at both the inlet and exit of the MTU. Each gas sampling system 40 consists of a diaphragm pump 41 capable of extracting 1 to 3 slm (standard liter per minute) of argon; a heated inlet gas line 42; a high-temperature ball valve 43; a sample tube 44; a needle valve 45; and a Sierra mass flowmeter 46. The inlet gas line 42 is heated to vaporize any aerosols present and to prevent any line losses due to vapor condensation. The sample tube 44 condenses more than 99.99% of incoming cadmium vapor. The condensate is analyzed for cadmium by inductively coupled plasma (ICP) spectroscopy.

A special line 50 consisting of a Sierra mass flowmeter 51 and a regulating valve 52 is available for exhausting part or all of the circulating flow. When used in conjunction with the isolation valve 30 and the feed line containing the blower 24, the CVS can be reconfigured as a once-through flow system or a bleed-and-feed system.

Figure 3:
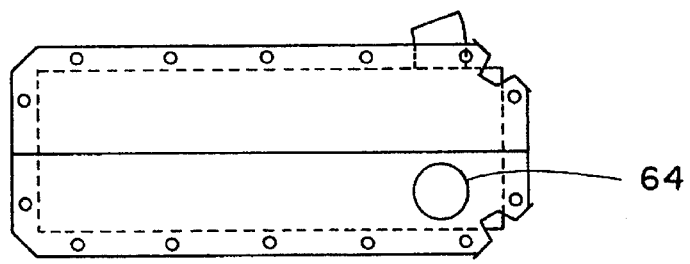
FIG. 3 shows a top view of the mass transfer unit of FIG. 2.
Figure 2:
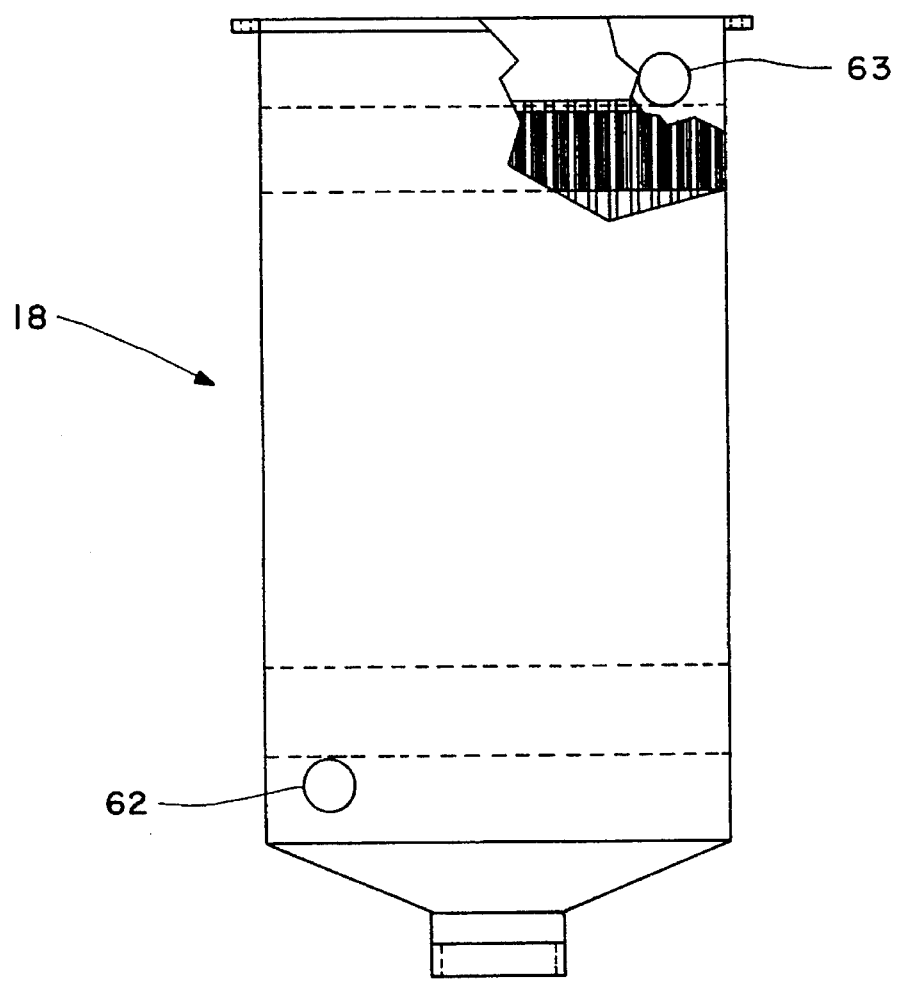
FIG. 2 shows a view of the mass transfer unit used in the system of FIG. 1.
Figures 4, 5:
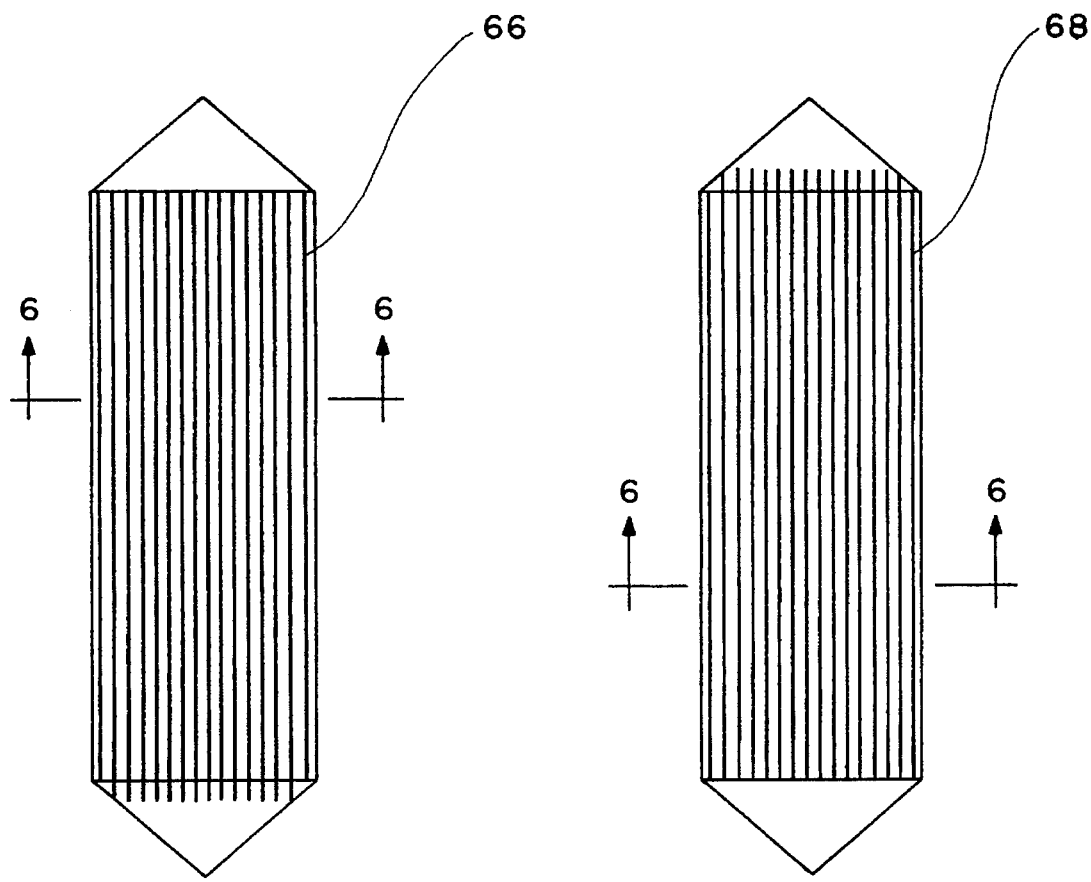
FIGS. 4 and 5 show a cross section of the mass transfer unit of FIG. 2 including the coolant channels and hot channels, respectively.

The mass transfer unit (MTU) 18, shown in FIG. 2, is configured as a counterflow heat exchanger optimized for mass transfer. The cadmium-containing gas enters the MTU 18 from at the inlet port 62 located at the bottom, in a superheated state and flows up. The cleaned gas, which acts as a heat sink, enters the MTU from the top inlet 64 as seen in FIG. 3, and flows down. As shown in FIGS. 4 and 5, the MTU contains twenty-five (25) coolant channels 66 separated by twenty-four (24) hot channels 68. They are spaced about 5-mm apart and each channel is about 4 inches wide and about 12 inches long. The plenums at top and bottom contain baffles that separate and direct flows to alternate channels. The channels are fitted with triangular corrugations with included angles of 53.6°.

The MTU is designed primarily to promote surface condensation of cadmium vapor and to suppress particulate formation. This is accomplished by providing sufficient internal surface area to condense vapor and relieve uncontrolled supersaturation buildup as the gas temperature drops. To further enhance vapor condensation and to achieve low gas cooling rate, a laminar flow is maintained in the MTU passages. With a 5-mm passage gap and a 5-scfm gas recirculation rate, the flow Reynolds number is less than 50. Corrugated inserts reduce the hydraulic diameter (dH) from 10 mm to 3.5 mm.

For simplicity of construction, the corrugated inserts are slipped into the channels with no requirement of thermal contact between them and the channel walls. A conservative estimate of heat transfer between the hot (contaminated) and cold (cleaned) fluids can be made by ignoring conductive heat transfer between the inserts and the walls. For a counterflow heat exchanger with fluids of equal capacity rates, the effectiveness factor $\epsilon$ relating hot ($T_h$) and cold ($T_c$) fluid temperatures is $$\epsilon = \frac{T_{h,in} - T_{h,out}}{T_{h,in} - T_{c,in}} = \frac{T_{c,out} - T_{c,in}}{T_{h,in} - T_{c,in}} = \frac{NTU}{1+NTU} \quad (1)$$

In Eq. (1), NTU, the number of transfer units, is defined as $$NTU = \frac{AU}{mc_p} \quad (2)$$

where, $$U = \left(\frac{1}{h_i} + \frac{1}{h_o} + \frac{\delta}{k_s}\right)^{-1} \quad (3)$$

and, $$h_i = h_o = \frac{Nu k}{d_H} \quad (4)$$

Figure 6:
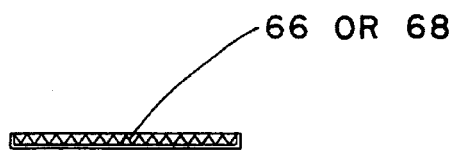
FIG. 6 shows a coolant or hot channel detail.

For the geometry of interest (i.e., triangular corrugations with 5-mm spacing and 53.6° included angle), the Nusselt number (Nu) is 2.423 for laminar flow. The channel walls are made from Type 304 SS ($k_s$=54 W/m-K) of 0.02-cm thickness ($\delta$). The specific heat ($c_p$) of argon is constant at 520 J/kg-K. Typically, $T_{h,in}$= 410° C., $T_{c,in}$=50° C., and the mass flow rate (m) is varied between 1 and 5 scfm. Under these conditions, the effectiveness factor is greater than 0.90. These values yielded the calculated temperature profiles shown in FIG. 6 for different flow rates. The contaminated gas enters the MTU in a superheated state and is subjected to a controlled cooling process as it flows up. Cadmium vapor begins to condense on the channel walls at the junction where the wall temperature ($T_s$) is below the dew point. Further downstream, the gas attains slight supersaturation, leading to vapor condensation on the corrugations, which are isothermal with the gas. The change in mole fraction (X) of cadmium due to vapor condensation on the channel walls and corrugations can be determined from the following equation:

$$\left(\frac{MW_g}{MW}\right)\frac{d\ln X}{dx} = -\left(\frac{A_i h_m}{u}\right)\left(1 - \frac{1}{S}\right)\theta_+ - \left(\frac{A_h h_m}{u}\right)\left(\frac{T}{T_s}\right)\left(1 - \frac{1}{S}\frac{P_s(T_s)}{P_s(T)}\right)\theta_+ \quad (5)$$

where, $A_h$=specific heat transfer area, m²/m³, $A_i$=specific internal surface area, m²/m³, $h_m$=mass transfer coefficient, MW=molecular weight of cadmium, $MW_g$=molecular weight of argon, $P_s$=saturation pressure of cadmium, S=supersaturation ratio, T=gas temperature $T_s$=channel wall temperature, $$h_m = \frac{Sh D}{d_H} = 3.023 \frac{D}{d_H} \quad (6)$$

where D, the vapor diffusivity, can be estimated from the kinetic theory of gases.

As mentioned earlier, the MTU is designed to maintain the supersaturation (S) below the critical value ($S_{cr}$) for the onset of homogeneous nucleation. These two variables can be monitored from the following equations:

$$\frac{dS}{dx} = -\left(\frac{A_i h_m}{u}\right)(S-1)\theta_+ - \left(\frac{A_h k_m}{u}\right)\left(S - \frac{P_s(T_s)}{P_s(T)}\right)\theta_+ + S\frac{d\ln P_s}{dT}\left(\frac{A_h U}{C_p u}\right)(T-T_c) \quad (7)$$

$$2(\ln S_{cr})^3 + \ln\left[\frac{1}{F_o}\left(\frac{P_s}{kT}\right)^2\left(\frac{2\sigma MW}{\pi N_A}\right)^{1/2}\frac{1}{\rho_l}\right](\ln S_{cr})^2 - \frac{4\pi}{3}\left(\frac{\sigma}{kT}\right)^3\left(\frac{MW}{N_A \rho_l}\right)^2 = 0 \quad (8)$$

$J_0$=unit nucleation rate, 1/m³·s k=Boltzmann constant $N_A$=Avagadro number, $T_c$=coolant temperature,
$\rho_1$=liquid density, and
$\sigma$=surface tension.

Figure 7:
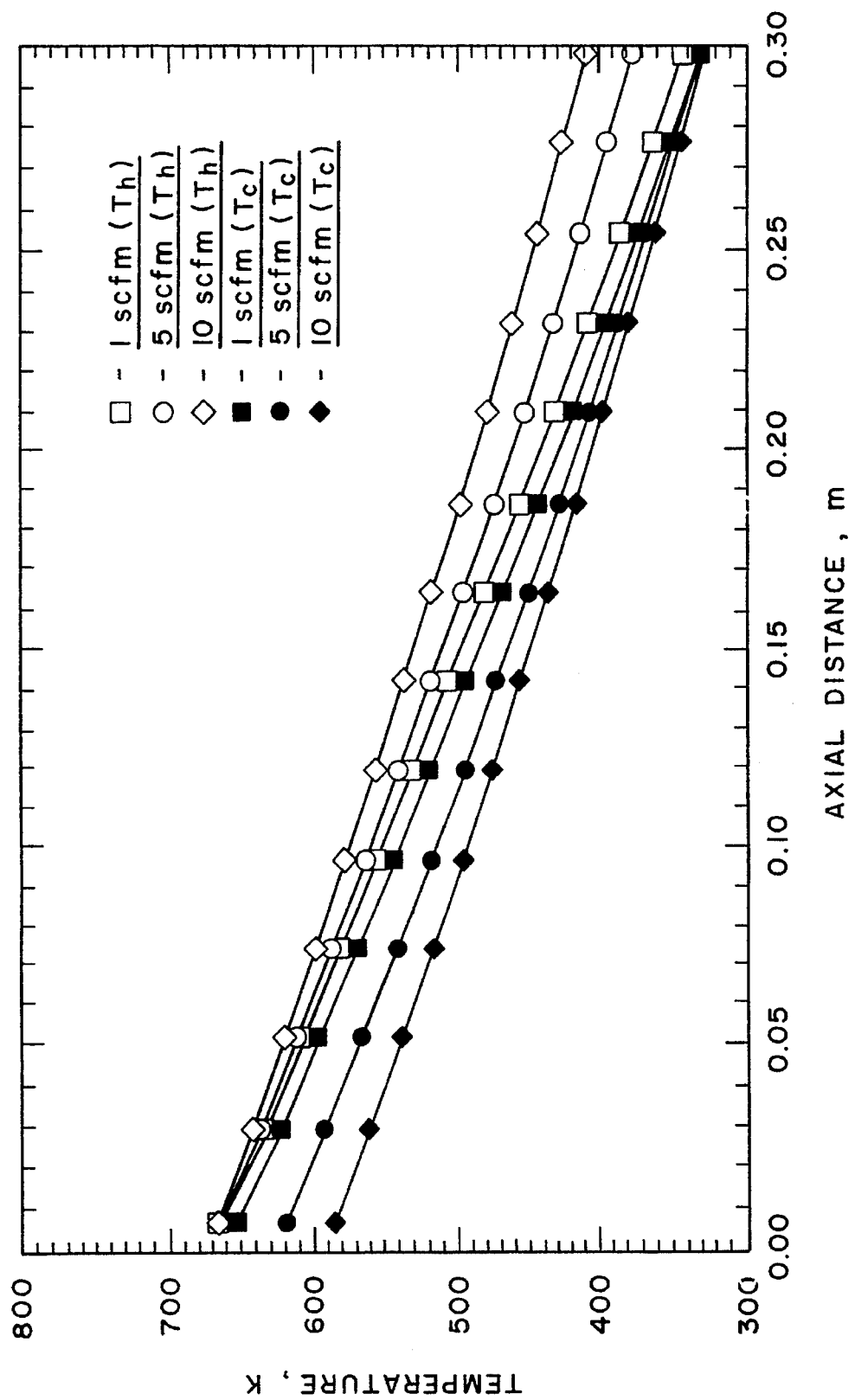
FIG. 7 shows the gas temperature profiles for different flow rates in the mass transfer unit of FIG. 2.
Figure 8:
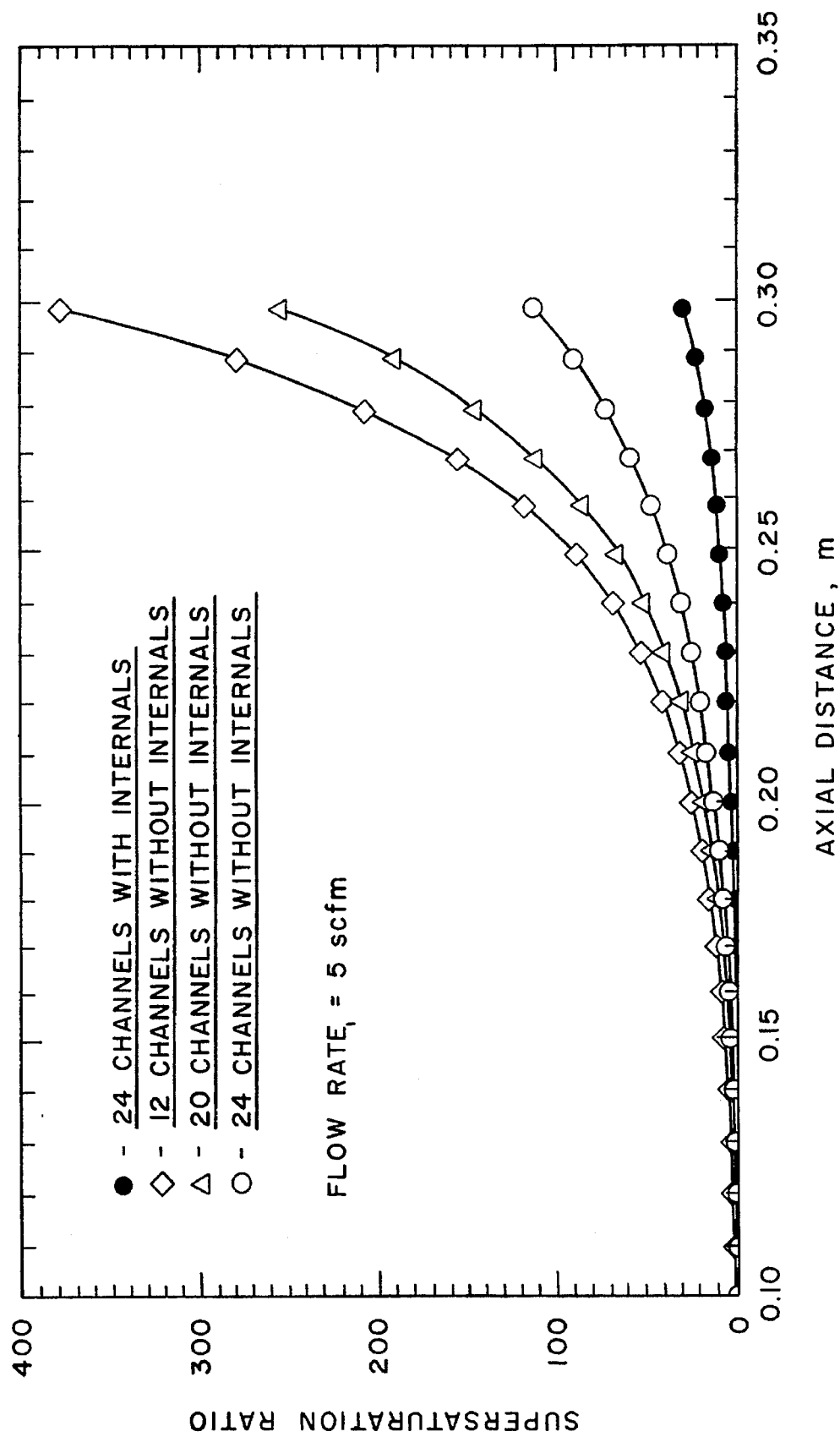
FIG. 8 shows the relief of supersaturation buildup with surface area per number of channels.

Some sample calculations illustrate the importance of using corrugated inserts. The boundary conditions for these calculations are $T_{h,in}$=410° C., $T_{c,in}$= 50° C., argon flow rate=5 scfm, and cadmium inlet concentration=2000 ppmw. FIG. 7 depicts an exponential growth in supersaturation as the gas temperature drops linearly with axial distance. By itself, vapor condensation on channel walls provides insufficient relief for the buildup of supersaturation. This is evidenced by S exceeding $S_{cr}$ and the attendant onset of uncontrolled nucleation as depicted in FIG. 8. The insertion of corrugated inserts arrests the rapid buildup in supersaturation and minimizes the possibility of aerosol formation. In general, S−1 represents the factor by which cadmium concentration in the gas stream leaving the MTU exceeds the minimum attainable level, (i.e., the saturation mole fraction corresponding to the exit temperature).

Figure 9:
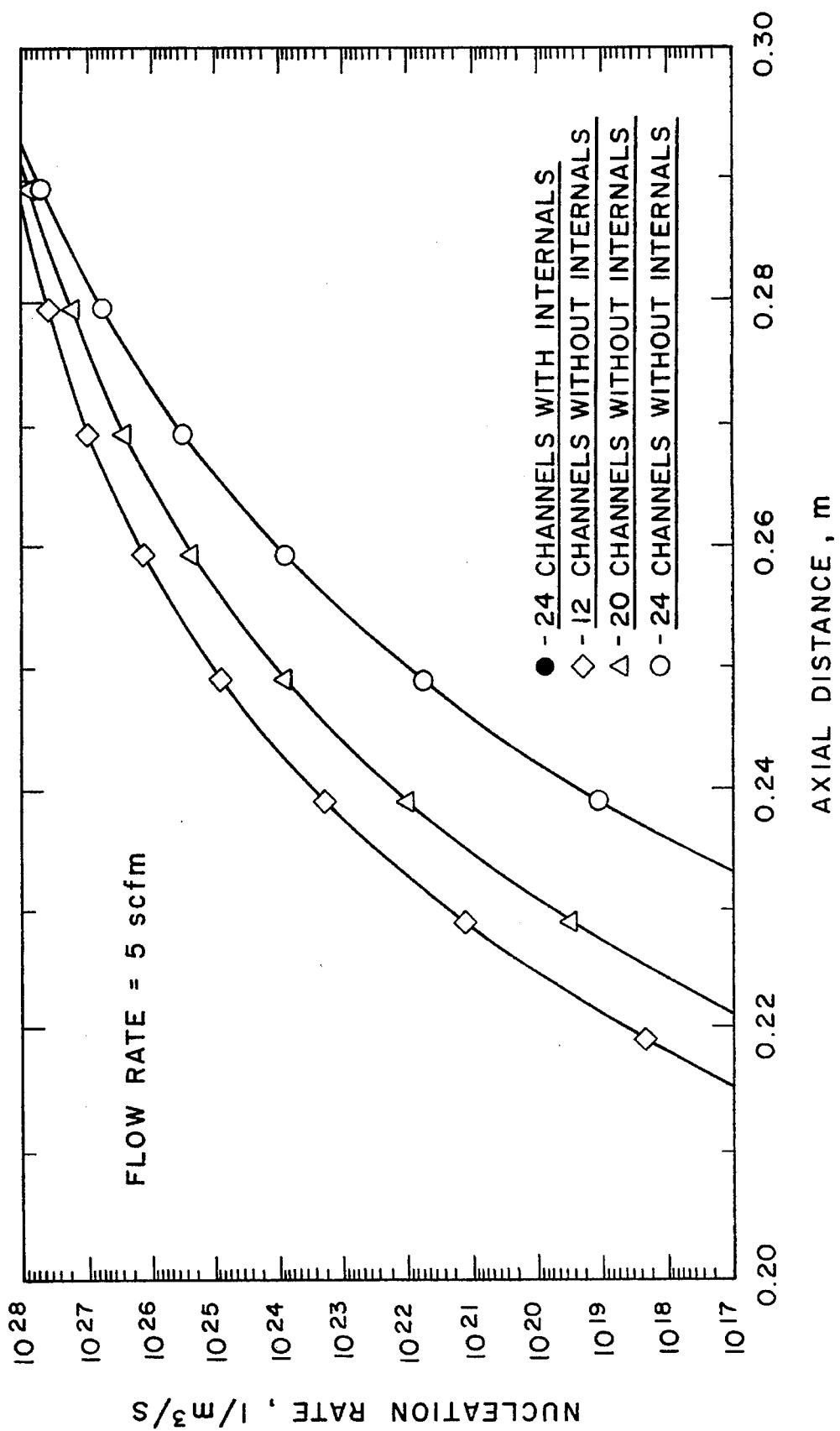
FIG. 9 shows the dependence of homogeneous nucleation rate on the axial distance and number of channels.
Figure 10:
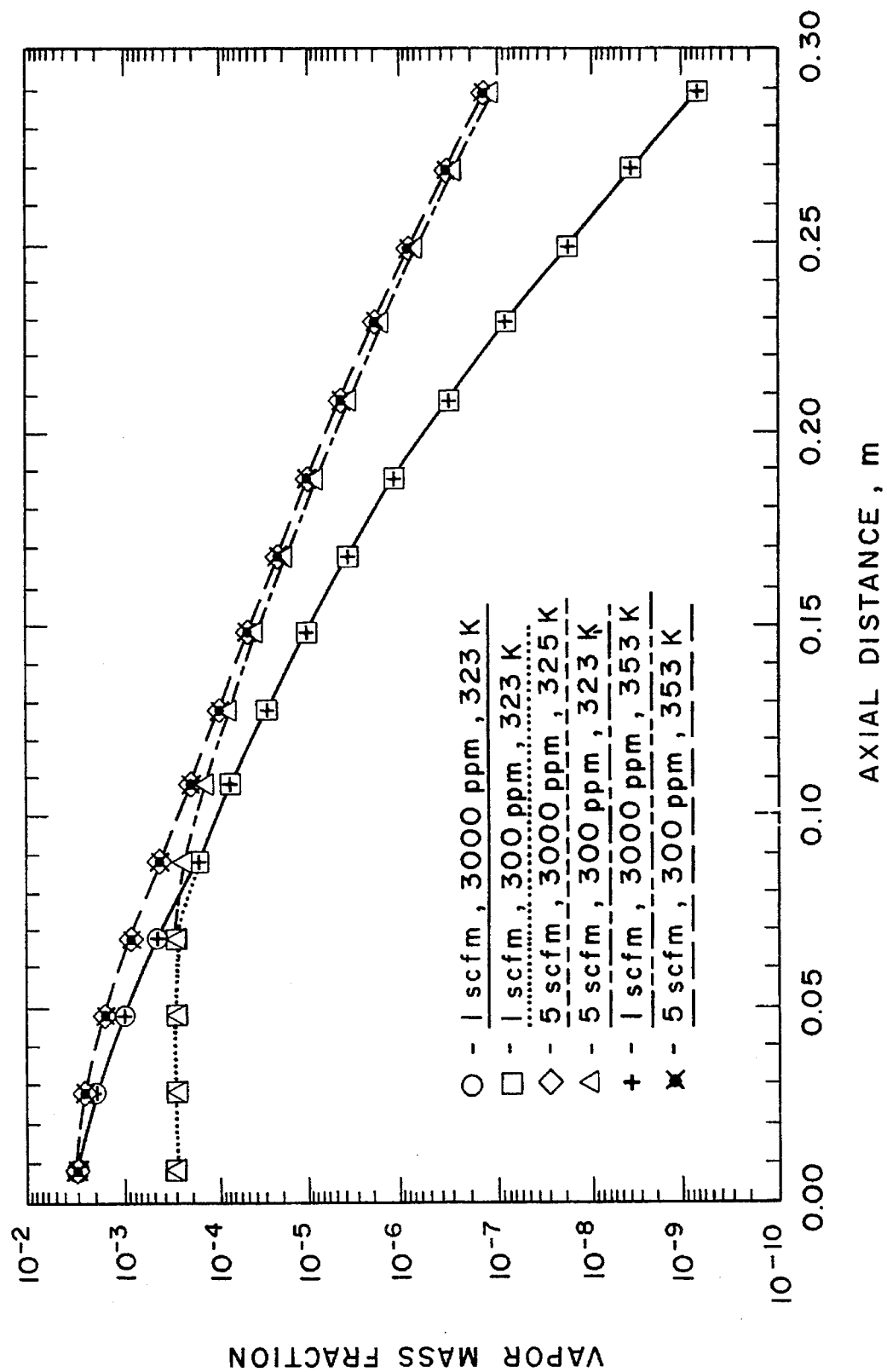
FIG. 10 shows the theoretical performance of the mass transfer unit of FIG. 2.

FIG. 9 exhibits the theoretical performance of the MTU as a function of gas recirculation rate, cadmium inlet concentration, and the coolant inlet temperature. The calculated concentration of cadmium at the exit of the MTU is seen to be sensitive to the gas flow rate, but relatively insensitive to the coolant inlet temperature and the inlet concentration. At 1 scfm, an exit concentration smaller than 0.001 ppmw can be reached. At 5 scfm, the smallest concentration achievable is about 0.15 ppmw. The theoretical cadmium collection efficiency at 1 scfm varies between 99.993% for 300 ppmw inlet concentration and 99.9993% for 3000 ppmw. The corresponding performance levels at 5 scfm are 99.95% and 99.995% respectively.

Figure 11:
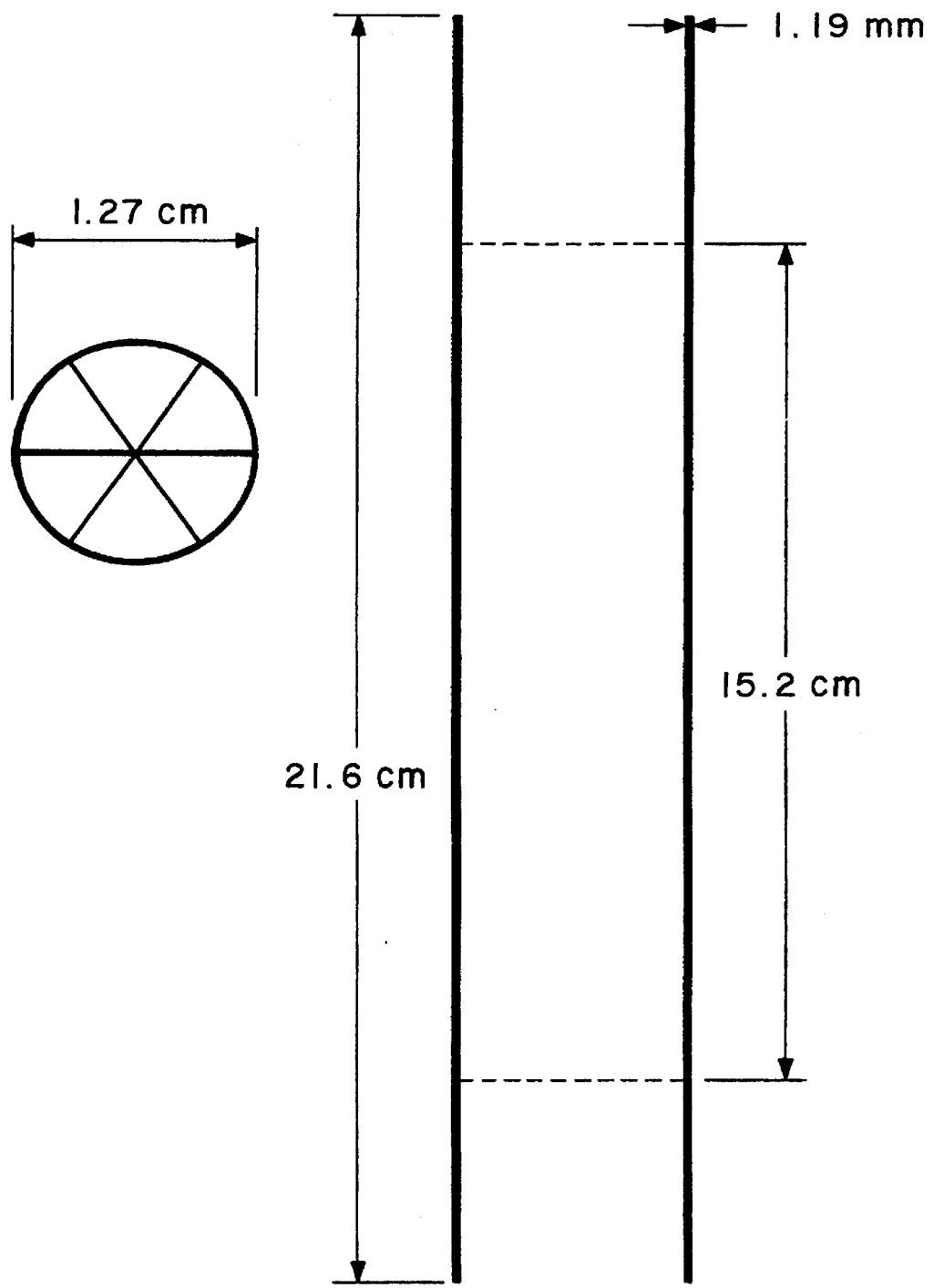
FIG. 11 is a schematic of a sample tube.
Figure 12:
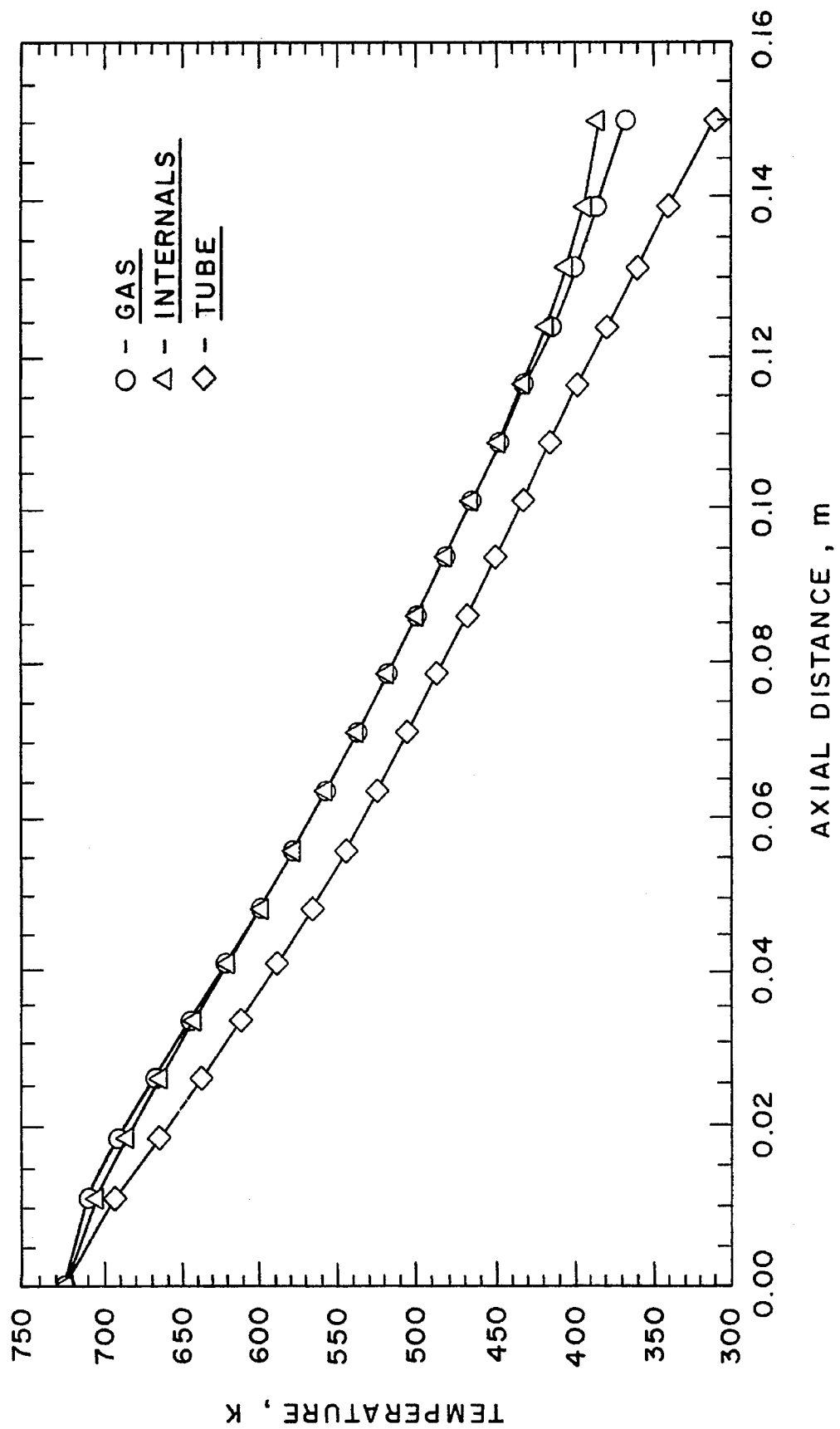
FIG. 12 shows a plot of gas and surface temperature profiles in the sample tube; and, FIG. 13 shows a plot of the theoretical performance of the sample tube (cadmium concentration profiles for different sampling rates and concentrations).
Figure 13:
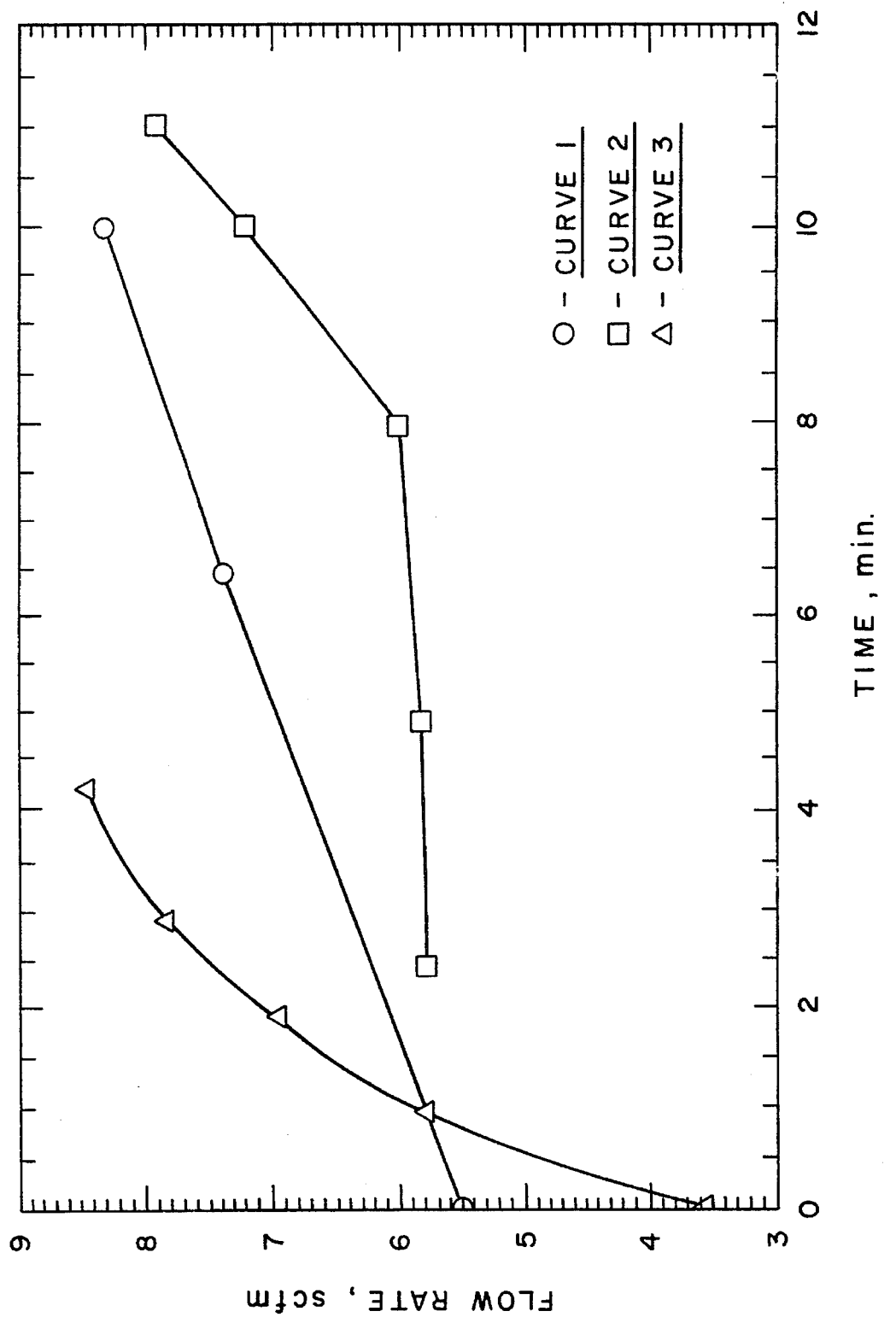

A sampling tube can be provided as part of the disclosed system. Referring to FIG. 11, the sampling tube is an application of the principle of the mass transfer unit: sufficient surface area to promote vapor condensation and controlled gas cooling to prevent homogeneous nucleation. Like the mass transfer unit 18, a sampling tube 70 is designed to condense cadmium vapor and prevent aerosol formation. The sampling tube is different from the MTU in the details of the internal geometry and in reliance on natural convection for external cooling. As shown in FIG. 11, the sample tube 70 is about 21.6 cm long with an active length of 15.2 cm and a diameter of 1.27 cm. It, too, has a corrugated interior (see FIG. 11a). The sample tube is positioned horizontally and is passively heated through conduction from the upstream high-temperature valve and by convective heat transfer from the hot sampled gas. It is cooled on the outside by natural convection. The resulting gas and surface temperature profiles are plotted in FIG. 12 at a 1.5-slm sampling rate. FIG. 13 depicts the cadmium condensation profiles for different concentrations and sampling rates. It shows that the sample tube has theoretical collection efficiency exceeding 99.99% when gas containing 200–2000 ppmw of cadmium vapor is sampled at 0.5–1.5 slm. The implementation of mass transfer unit principles is an ideal application for vapor traps. Depending on the intended application, external heating may be required to better control the temperature gradient.

On a number of occasions, the corrugated channels of the mass transfer unit 18 will become plugged with cadmium condensate. Plugging is detected when the gas circulation rate decreases sharply at constant blower power. Three different methods for regenerating the mass transfer unit are possible. The first method consists of simply raising the blower 16 power at normal pipe temperatures to reach or exceed the original circulation rate. As an example, this method was tried when the circulation rate had decreased from an original set point of 5-scfm to 2 scfm, and was decreasing rapidly. When the blower 16 power was raised to reach the original set point, the circulation rate had exceeded the set point and reached 6 scfm. The blower 16 power can be readjusted to regain the 5-scfm throughput. The flow recovery using this method is shown as curve 1 in FIG. 14. Raising the blower power to a 5.7- scfm throughput results in a nonlinear variation in flow rate, as shown by curve 2 in FIG. 14. The act of increasing gas flow rate causes the condensation front to move downstream in the channel and also heats the deposit formed at a lower flow rate. If the deposit responsible for area constriction is heated above the melting point, the flow restriction is relieved.

The overall procedure for effecting flow recovery by this first method includes the following. Raise the blower power to increase gas circulation rate above the level at which the deposit was formed. For example, if the original circulation rate was 2 scfm prior to flow plugging, raise the blower power to obtain a 3 scfm circulation rate. Next, hold the blower power at this new setting for about 20–30 minutes, or longer, until the circulation rate starts to creep above about 4 scfm. The blower power is then lowered to reduce the circulation rate back to 3 scfm. These steps are repeated until full or maximum flow recovery is obtained. The overall procedure may take up to 1 hour.

More complete flow recovery can be obtained with another method, identical to the method described above, except that the inlet pipe temperature is also raised. After a sharp drop-off in flow rate, raising the pipe temperature by 50° C.–250° C. above the original setting, e.g., from an original setting of about 330° C. to 380° C., along with regulating the flow throughput from 3.6 scfm to 5.75 scfm, resulted in more complete relief of flow blockage in a shorter amount of time (about 10 minutes). The resulting transient leading to expedient flow recovery is shown as curve 3 in FIG. 14.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which an exclusive property or privilege is claimed are defined as follows:

1. A process for cleaning an inert gas contaminated with a metallic vapor comprising a) withdrawing gas containing the metallic contaminant from a gas atmosphere of high purity argon;

b) passing the gas containing the metallic contaminant to a mass transfer unit having a plurality of hot gas channels separated by a plurality of coolant gas channels;

c) cooling the contaminated gas as it flows upward through the mass transfer unit to cause contaminated gas vapor to condense on the gas channel walls;

d) regenerating the gas channels of the mass transfer unit;

e) returning the cleaned gas to the gas atmosphere of high purity argon.

2. The method of claim 1 wherein the condensing of the contaminant-containing vapor occurs while suppressing contaminant particulate formation.

3. The method of claim 2 wherein the condensing of the contaminant-containing vapor is promoted by providing a sufficient amount of surface area in the mass transfer unit to cause the vapor to condense and relieve supersaturation buildup such that contaminant particulates are not formed.

4. The method of claim 3 wherein condensation of the contaminant is prevented on supply and return lines in which the contaminant containing gas is withdrawn and returned from and to the electrorefiner and mass transfer unit by heating and insulating the supply and return lines.

5. In a process in which spent nuclear fuel is processed in an argon gas glove-box by placing the spent fuel in baskets that are introduced into an electrorefiner vessel containing a molten LiCl-KCl salt over a pool of cadmium, subjecting the fuel to an electrorefining process to remove 99.9% of the actinides from the fuel, but in which cadmium vapor is released from the electrorefiner into the glove-box, causing blackening of the glove-box walls, a method for removing the cadmium from the argon comprising:
  a) withdrawing the argon gas contaminated with cadmium vapor from the electrorefiner;
  b) directing the cadmium-containing gas to a mass transfer unit;
  c) subjecting the cadmium-containing gas to a controlled cooling process to promote condensation of cadmium vapor in the mass transfer unit while suppressing particulate formation, such that the gas is now cleaned of cadmium;
  d) removing the cleaned gas from the mass transfer unit and cooling it;
  e) passing the cleaned and cooled gas back to the mass transfer unit and returning the cleaned gas to the electrorefiner.

6. The method of claim 5 wherein the condensing of cadmium vapor is promoted by providing a sufficient amount of surface area in the mass transfer unit to cause the vapor to condense and relieve supersaturation buildup such that cadmium particulates are not formed.

7. The method of claim 6 wherein condensation of cadmium is prevented on supply and return lines in which the cadmium containing gas is withdrawn and returned from and to the electrorefiner and mass transfer unit by heating and insulating the supply and return lines.

8. The cadmium removal method of claim 7 including the step of cleaning the mass transfer unit of cadmium by isolating the electrorefiner; heating clean gas supplied by a feed blower; passing the heated gas back to the mass transfer unit such that the flow of hot gas through the mass transfer unit raises the temperature of the condensed cadmium, causing the cadmium to melt and flow down through the mass transfer unit into a collector at the bottom of the mass transfer unit.

9. The method of claim 8 including the step of regenerating the mass transfer unit by raising the power of the feed blower.

10. The method of claim 9 wherein the step of regenerating the mass transfer unit includes raising the inlet temperature of the pipe through which the clean gas is supplied by the feed blower.

11. The method of claim 5 including the step of monitoring the cadmium concentration by providing a sample tube in which cadmium vapor is condensed and in which aerosol formation is prevented.

* * * * *